United States Patent Office 3,107,763
Patented Oct. 22, 1963

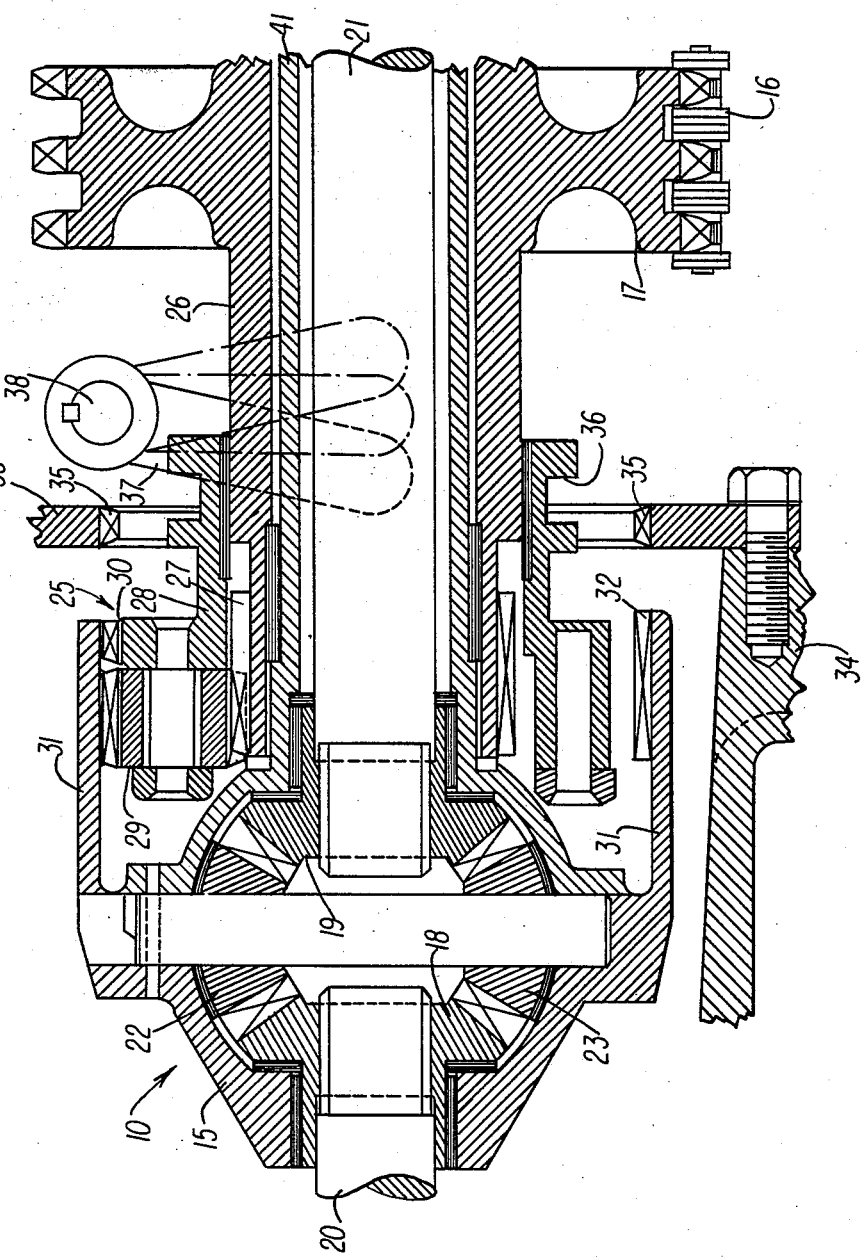

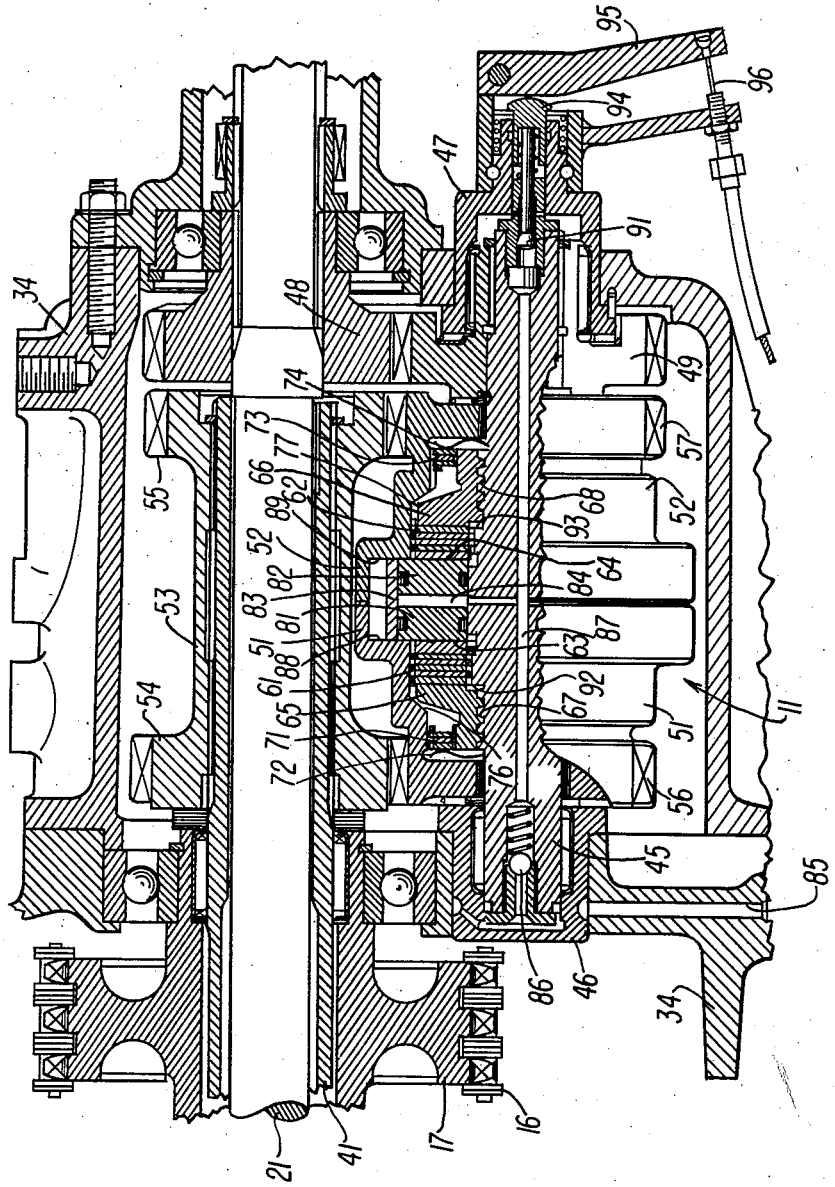

3,107,763
DUAL ONE-WAY CLUTCH FOR DIFFERENTIAL
CONTROL
Claude Hill, Kenilworth, England, assignor to Harry
Ferguson Research Limited, Abbotswood, Stow-on-the-
Wold, England, a British company
Filed Apr. 11, 1960, Ser. No. 21,467
Claims priority, application Great Britain Apr. 15, 1959
3 Claims. (Cl. 192—41)

This invention relates generally to drive gearing for automotive vehicles and concerns, more particularly, differential gearing intended primarily for transmitting power to the ground wheels of four-wheel drive vehicles.

The basic aim of the invention is to provide a novel and improved structure for positively limiting the differential action of a differential gear to predetermined limits. Such limited action, or "controlled," differentials find particular utility in distributing power from the engine to both the front and rear axles of a four-wheel drive vehicle. A vehicle driving system of this type is shown in some detail in my U.S. Patent No. 2,796,941, issued June 25, 1957. As described therein, a controlled differential gear distributing power to the front and rear axles of a vehicle gives the traction efficiency of full time four-wheel drive without tire scrub caused by cornering or variations in wheels size, while the "control" of the controlled differential avoids both traction loss should one or two wheels slip or spin on ice or mud and braking force loss upon skidding and "locking up" of one of the wheels when the brakes are applied.

More specifically, it is an object of the invention to provide a novel dual one-way clutch arrangement for positively limiting rotational speed variations between two rotating members. That is, the speed of rotation of one member is permitted to differ from the speed of the other only within predetermined higher and lower limits. It is a related object to provide such a clutch arrangement that is particularly suitable for limiting the differential action of a differential gear.

A further object is to provide a novel dual one-way clutch arrangement as characterized above that is exceptionally compact and hence well suited for practical, commercial use. Moreover, it is an object to provide such a dual one-way clutch arrangement which is enclosed and self-contained so as to be usable in oil-carrying housings such as transmission boxes.

In more detail, it is an object to provide a one-way clutch of the above type that is very reliable in operation since wedging members which tend to jam are not employed. A collateral object is to provide such a clutch that can be quickly and positively disabled no matter how the clutch parts are loaded.

It is also a more detailed object to provide a novel dual one-way clutch arrangement embodying a particularly simple annular fluid motor that is reliable and inexpensive. It is an allied object to provide such a clutch arrangement as described above in which quick positive disabling of two clutches is accomplished simultaneously through a single agency.

Other objects and advantages of the invention will become apparent upon reading the following detailed description and upon reference to the drawings in which:

FIGURE 1 is a fragmentary section showing a reversible differential gear suitable for use in an automotive power train; and FIG. 2 is a fragmentary section of a dual one-way clutch arrangement embodying the invention for limiting the differential action of the differential gear shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawings, there is shown a differential gear 10 (FIG. 1) whose differential action is limited by a dual one-way clutch assembly 11 (see FIG. 2) which embodies the invention. In the illustrated construction, the differential 10 is employed as the intermediate differential of a four-wheel drive power train of the type shown in U.S. Patent No. 2,796,941 referred to above. Thus, the input element of the differential, which in the present case is a carrier 15, is driven from the vehicle engine, not shown, through a chain 16 and a sprocket 17. The output elements of the differential 10, that is sun gears 18 and 19, are keyed respectively to drive shafts 20 and 21. The drive shafts 20 and 21 extend forwardly and rearwardly of the differential gear 10 and supply power to the front and rear axles of the vehicle. Planet gears 22 and 23 couple the input and output elements of the differential gear 10 in the usual manner.

For reversing the direction of rotation of the drive shafts 20, 21, the sprocket 17 is coupled to the differential gear carrier 15 through reversing gearing 25 which, in the illustrated embodiment, is of the epicyclic type. To this end, the sprocket 17 is formed with a sleeve portion 26 which is journalled about the drive shaft 21 and which carries a sun gear portion 27. A carrier 28 is slidably and rotatably mounted on the sleeve portion 26 and carries a plurality of planet gears 29. The planet gear carrier 28 is also formed with a plurality of teeth 30.

The input element of the differential gear 10, that is the carrier 15, is formed with an annular portion 31 carrying a ring of internal gear teeth 32. The planet gears 29 are in meshing engagement with both the gear teeth 32 and the sun gear 27 formed on the sprocket sleeve 26.

Spaced from the internal gear teeth 32 is a plate 33 secured to the transmission housing 34 and which is formed with a ring of internal dogteeth 35.

The gear carrier 28 is selectively positionable into any one of three positions. When the carrier occupies the position shown in FIG. 1, the teeth 30 on the carrier engage the teeth 32 on the annular portion 31 and thus a direct one-to-one drive is established between the sprocket 17 and the carrier 15 which serves as the input element of the differential gear 10. When the carrier 28 is shifted fully toward the right in FIG. 1, the gear teeth 30 mesh with the dogteeth 35 on the plate 33 so as to lock the carrier against rotation. This establishes a reverse drive from the sprocket 17 through the planet gears 29 to the input of the differential gear 10. In its third intermediate position, the epicyclic gear carrier 28 is positioned so that its gear teeth 30 are disposed in the space between the internal gear teeth 32 and the dogteeth 35 so that the epicyclic gearing 25 will not transmit power from the sprocket 17 to the differential gear 10 and hence the drive is in neutral.

For shifting the sleeve 28, the sleeve is provided with an annular groove 36 which is engaged by a shifter fork 37 keyed to a shaft 38. By rotating the shaft 38 in any convenient manner, the shifter fork 37 can be swung from its solid line FIG. 1 position to either of its dot-dash line positions shown in that figure so as to shift the epicyclic gearing 25 into neutral or reverse from the direct drive position illustrated.

The action of the differential gear 10, whether in direct or reverse drive, is conventional. In normal operation when power is being supplied evenly to the drive shafts 20, 21, the drive shafts and the differential gear carrier 15 all rotate in unison without relative movement between any of the parts. However, should the drive shaft loading become uneven, then the relative speeds of the two drive shafts change, this being permitted by rotation of the differential carrier 15 relative to both of the drive shafts. Such differential action, that is one drive shaft rotating more rapidly or less rapidly than the other, is always accompanied by relative rotation between the drive shafts and the differential carrier 15, as is well known to those familiar with this art.

In carrying out the invention, the differential carrier 15 includes a sleeve 41 journalled about the drive shaft 21, and the dual one-way clutch assembly 11 is arranged to limit rotational speed variations between the shaft 21 and the sleeve 41. That is, the clutch assembly 11 permits the sleeve 41 to differ in rotational speed from the shaft 21 only between predetermined higher and lower limits. If these speed limits tend to be exceeded, the clutch assembly 11 locks the shaft 21 and the sleeve 41 together for rotation at the differential speed limits imposed. Thus, the differential action of the differential gear 10 is limited.

In the preferred construction, the sleeve 41 extends past the sprocket 17 to a point adjacent the clutch assembly 11, and the dual one-way clutch 11 includes a layshaft 45 journalled parallel to the shaft 21 and the sleeve 41. The opposite ends of the layshaft 45 are journalled in fluid-transmitting cups 46 and 47 mounted in apertures formed in the transmission housing 34. For setting up rotational speed limits, the drive shaft 21 is coupled to the layshaft 45 through gears 48 and 49, and the sleeve 41 is coupled to a pair of cup-shaped housing members 51 and 52 which are journalled on the layshaft in opposed adjacent relation. Preferably, the sleeve 41 rotatably carries a unitary base 53 formed with gears 54, 55 which mesh with gears 56 and 57 formed on the housing members 51, 52 respectively.

The gear pairs 48 and 49, 54 and 56, and 55 and 57, all established slightly different driving ratios so that the housing 51 rotates in the same direction as the layshaft 45 but at a slightly higher speed while the housing 52 rotates in the same direction as the layshaft 45 but at a slightly slower speed. The speed differences between the housing 51 and the layshaft, and the housing 52 and the layshaft, are the relative speed limitations imposed by the assembly 11 on the drive shaft 21 and the sleeve 41. It will thus be apparent that these limitations can be varied by selecting appropriate driving ratios for the several gear pairs connecting the shaft 21 to the layshaft 45 and the sleeve 41 to the two housing members 51, 52.

To lock the shaft 21 and the sleeve 41 together as the shaft speed moves up or down to the predetermined limits, sets of annular friction plates 61 and 62 are disposed in the housings 51, 52 respectively. The several plates in each of the sets 61, 62 are alternately keyed to the surrounding housing and the layshaft 45 so that when they are pressed together they frictionally clutch their respective housings to the layshaft. It will be seen that locking of either one of the housings 51, 52 to the layshaft 45 also results in locking the shaft 21 and the surrounding sleeve 41 together for rotation at the relative speeds imposed by the pairs of gears 54, 56 or 55, 57. This, of course, halts the differential action of the differential gear 10.

For operating the sets of friction plates 61, 62, the plates are sandwiched between abutment surfaces 63 and 64 and annular clutch-operating nut members 65 and 66. Movement of the annular clutch-operating members 65, 66 toward the adjacent sets of friction plates 61, 62 causes the plates to be pressed against the abutment surfaces 63, 64 so that the plates clutch together and lock the surrounding housings to the layshaft 45.

Pursuant to the invention, the clutch-operating member 65 acts on the adjacent set of friction plates 61 only when the layshaft speed exceeds the speed of rotation of the housing 51, and the clutch operating member 66 acts on the adjacent set of friction plates 62 only when the layshaft speed becomes less than the speed of rotation of the housing 52. To accomplish this result, the members 65, 66 have nut portions threadably engaging helical threads formed on the layshaft at 67 and 68 respectively, and a frictional drag is imposed between each nut member 65, 66 and its surrounding housing. In the illustrated construction, the frictional drag referred to is provided by a plurality of friction discs 71 which are alternately keyed to the nut member 65 and the surrounding housing 51 and which are urged into frictional engagement by a spring 72. A similar plurality of friction discs 73 urged together by a spring 74 are alternately keyed to the nut member 66 and the surrounding housing 52. The frictional action of the drag discs 71, 73 tends to cause the nut members 65, 66 to rotate in unison with their respective housings 51, 52. Because the housings 51, 52 rotate at speeds which differ from the speed of the layshaft 45, the nut portions 65, 66 tend to rotate relative to the helical threads formed on the layshaft at 67 and 68.

In the illustrated construction, the helical threads formed in the layshaft 45 are of the same hand so that rotation of the nut member 65, as it is dragged by the housing 51 at a rotational speed that is higher than the rotational speed of the layshaft 45, tends to run the nut member 65 away from the set of friction plates 61 and toward the left in FIG. 2. Conversely, rotation of the nut member 66, as it is dragged by the housing 52 at a speed slightly less than the speed of rotation of the layshaft 45, tends to run the nut member 66 toward the right in FIG. 2 and away from the set of friction plates 62. Abutments 76 and 77 on the housings 51, 52 respectively limit the threadable movement of the nut members 65, 66 away from the adjacent sets of plates 61, 62.

When the speed of the layshaft 45 increases so that it rotates more rapidly than the housing member 51, the drag plates 71 tend to relatively retard the nut member 65 so that its threadable engagement at 67 with the layshaft runs the nut member toward the right in FIG. 2, squeezing the set of friction plates 61 against the abutment surface 63 and locking the layshaft 45 to the housing member. Thus, the speed of the shaft 21 can only increase relative to the rotational speed of the surrounding sleeve 41 to the point where the layshaft 45 is rotated at the same speed as the housing 51. Any further speed differential causes the nut 65 to be run toward the right in this figure with the result that the layshaft and the housing 51 are locked together and the drive shaft 21 is rotatably coupled to the sleeve 41 through pairs of gears 54, 56 and 48, 49.

Similarly, when the rotational speed of the layshaft 45 drops below the rotational speed of the housing 52, the drag imposed by the plates 73 on the nut member 66 tends to rotate the nut member at a speed higher than the speed of the layshaft with the result that the nut member is run toward the left in FIG. 2 thereby squeezing the set of friction plates 62 and locking the layshaft to the housing 52. As observed above, this locks the drive shaft 21 to the sleeve 41 and ceases the differential action at the differential gear 10. In this way, the speed of the drive shaft 21 cannot decrease relative to the rotational speed of the sleeve 41 beyond the point where the rotational speed of the layshaft 45 becomes less than the speed of the housing 52. When this limit is reached, the friction discs 62 are effective to lock the drive shaft 21 in the sleeve 41 together through the pairs of gears 55, 57 and 48, 49.

In effect, the housing member 51 is the overrunning member with respect to the layshaft 45 of one overrunning oneway clutch, while the layshaft 45 is the overrunning member with respect to the housing member 52 of a second overrunning one-way clutch. Thus, either an increase or decrease in rotational speed of the layshaft relative to the housing members 51, 52 is limited by the one-way effect of the two overrunning clutches.

The limits within which the differential action of the gear 10 is held is sufficient to permit the vehicle being driven to turn as sharply as its steering gear permits and to accommodate slight wheel diameter variations as might be caused by differences in tire inflation or uneven loading of the vehicle. In other words, sufficient differential action is permitted in the differential gear 10 to accommodate all normal reasons why the drive shaft powering the front wheels of the vehicle should rotate more or less rapidly than the drive shaft powering the rear wheels of the vehicle.

When an abnormal condition is encountered such as complete loss of traction at one wheel when the tire slips in mud or on ice, it will be understood that the drive shafts 20, 21 will tend to operate at much different speeds. Because of the control exerted on the differential gear 10, the differential action is ended at the predetermined limit so that power is supplied to the non-slipping wheels. This action is also important when, during braking of the vehicle, one or two wheels tend to lock as their tires skid on slippery pavement. When this occurs, the rotational speeds of the drive shafts 20, 21 tend to exceed the differential action permitted at the differential gear 10. Since the differential locks at the limits imposed by the clutch 11, each wheel of the vehicle is forced to maintain a braking effort.

It will, of course, be appreciated that should the direction of rotation of the drive shaft 21 and sleeve 41 be reversed, as by shifting the epicyclic gearing 25, the threadable engagement at 67, 68 would cause both sets of friction plates 61, 62 to lock when the rotational speed of the layshaft 45 is less than the speed of the housing 51 and greater than the speed of the housing 52 which, of course, is the normal condition occurring when the drive shaft and sleeve 41 rotate uniformly. It is therefore necessary that the dual one-way clutch assembly 11 be disabled when the epicyclic gearing 25 is shifted into reverse position.

In keeping with the invention, the abutment surfaces 63, 64 against which the friction plates 61, 62 are urged are defined by a pair of annular pistons 81 and 82 whose positions are controlled by fluid pressure so that by releasing this pressure both sets of friction plates in the clutch assembly 11 are disabled. In the illustrated embodiment, the pistons 81, 82 are positioned between the layshaft 45 and a cylinder member 83 so as to define a chamber 84 lying between the two pistons. Fluid is conducted to the chamber 84 under pressure from a conduit 85 through a one-way valve 86 and a passage 87 formed in the layshaft 45. Hydraulic fluid is supplied under pressure to the conduit 85 from any convenient source and it can be seen that the pressure of such fluid tends to urge the pistons 81, 82 apart until their abutment surfaces are stopped against ledge portions 88 and 89 formed on the housing members 51, 52 respectively.

To disable the clutch assembly 11, a valve 91 at one end of the passage 87 is opened to exhaust the fluid under pressure from the chamber 84 so that when the nut members 65, 66 move against the adjacent sets of friction plates 61, 62 the plates simply slide freely and no braking or locking action is created. To prevent the members 65, 66 from simply following the retreating pistons 81, 82, stop ledges 92 and 93 are formed on the layshaft 45 so as to limit the threadable movement of the nut members 65, 66.

For controlling the valve 91 which disables the clutch assembly 11, a plunger 94 is slidably fitted in the cap 47 underlying a lever 95 pivoted on the cap. A Bowden wire 96 is secured to the lever 95 and extended to the control utilized for disabling the clutch assembly 11. Conveniently, the control for the Bowden wire 96 can be associated with the epicyclic gearing control shaft 38 with the arrangement being such that when the shaft 38 is swung so as to shift the gearing 25 into the reverse position, the Bowden wire 96 is drawn so as to pull the lever 95 in a clockwise direction as seen in FIG. 2. In this way, shifting the drive into reverse is accompanied by simultaneously unseating the valve 91 and disabling of the dual one-way clutch assembly 11.

Those skilled in the art will appreciate that the clutch assembly 11 is particularly compact and hence well suited for commercial use in vehicle transmissions. Moreover, it will be seen that the opposed cup-shaped housing members 51, 52 are effective to completely enclose the internal elements of the clutch assembly so that the assembly is self-contained and suitable for use in a transmission housing that is normally filled with a lubricant.

It will further be understood that the fluid motor provided by the pistons 81, 82 while unusually simple and economical, quickly and completely disables the clutch assembly whether or not substantial torque forces are being transmitted by the clutch assembly. For example, if the differential 10 and clutch assembly 11 were installed in a vehicle that was left parked facing uphill with the gearing 25 shifted into direct forward drive, it will be understood that the weight of the vehicle would be transferred through the differential in a direction tending to turn the drive shafts 20, 21 and the sleeve 41 in reverse direction. Since the gearing 25 is in direct driving position, the clutch 11 is not disabled and hence the tendency of the drive shafts to rotate in their reverse direction locks up both sets of friction plates 61, 62 and this, due to the differing gear ratios of the gears 54, 56 and 55, 57, locks the drive shafts 20, 21 against any rotation. Therefore, while the clutch assembly 11 prevents the vehicle from slipping backwardly, the clutch parts are subjected to substantial torque forces. It has been found that with conventional one-way clutch constructions, the imposition of such forces makes it extremely difficult to break the locking effect and disable the clutches. In the construction shown herein, immediate disabling is possible by simply venting the hydraulic pressure in the chamber 84. The pistons 81, 82 are not directly subjected to the torque forces and hence they easily give way, releasing the adjacent sets of friction plates and disabling both sections of the dual clutch assembly 11.

I claim as my invention:

1. A dual one-way clutch arrangement for positively limiting rotational speed variations between two rotating parts comprising, in combination, a frame, a shaft journalled in said frame, a pair of cup-shaped housing members journalled on said shaft and disposed in opposed adjacent relation so as to define a chamber therein, a set of annular friction plates within each of said housing members and being alternately keyed to the shaft and their respective housing member, means defining an abutment surface adjacent each set of friction plates, a nut member disposed within each housing member adjacent said sets of plates so that each set of plates is sandwiched between the adjacent abutment surface and one of said nut members, means for establishing a frictional drag between each housing member and the nut member disposed therein so that rotation of the housing members tends to rotate their respective nut members, one of said rotating parts being drivingly coupled to said shaft, the other of said rotating parts being drivingly coupled to each of said housing members so as to rotate the first member at a higher speed than the second member, means defining a helical threaded interengagement between said shaft and the nut member in said first housing member tending to urge the nut member away from the adjacent friction plates when the rotational speed of said shaft is less than the speed at which the first housing member tends to drag its nut member, and means defining a helical threaded interengagement between said shaft and the nut member in said second housing member tending to urge the nut member away from the adjacent friction plates when the rotational speed of said shaft is greater than the speed at which the second housing member tends to drag its nut member.

2. A dual one-way clutch arrangement for positively limiting rotational speed variations between two rotating parts comprising, in combination, a frame, a shaft journalled in said frame, a pair of housing members journalled on said shaft, a set of friction elements associated with each of said housing members and being anchored to the shaft and the respective housing member, a nut member disposed adjacent each housing member with each nut member being operatively coupled to one set of friction elements, means for establishing a frictional drag between each housing member and the nut member adjacent thereto so that rotation of the housing members tends to rotate their respective nut members, one of said rotating parts being drivingly coupled to said shaft, the other of said rotating parts being drivingly coupled to each of said housing members so as to rotate the first member at a higher speed than the second member, means defining a helical threaded interengagement between said shaft and the nut member in said first housing member tending to urge the nut member so as to operate the coupled friction elements when the rotational speed of said shaft is greater than the speed at which the first housing member tends to drag its nut member, and means for defining a helical threaded interengagement between said shaft and the nut member in said second housing member tending to urge the nut member so as to operate the coupled friction elements when the rotational speed of said shaft is less than the speed at which the second housing member tends to drag its nut member.

3. A dual one-way clutch arrangement for positively limiting rotational speed variations between two rotating parts comprising, in combination, a frame, a shaft journalled in said frame, a pair of cup-shaped housing members journalled on said shaft and disposed in opposed adjacent relation so as to define a chamber therein, a set of annular friction plates within each of said housing members and being alternately keyed to the shaft and the respective housing member, a pair of adjacent annular pistons slidably disposed on said shaft within said chamber, one of said pistons defining an abutment surface adjacent on of said friction plates and the other of said pistons defining an abutment surface adjacent the other set of friction plates, a nut member disposed within each housing member adjacent said sets of plates so that each set of plates is sandwiched between the adjacent abutment surface and one of said nut members, means for establishing a frictional drag between each housing member and the nut member disposed therein so that rotation of the housing members tends to rotate their respective nut members, one of said rotating parts being drivingly coupled to said shaft, the other of said rotating parts being drivingly coupled to each of said housing members so as to rotate the first member at a higher speed than the second member, means defining a helical threaded interengagement between said shaft and the nut member in said first housing member tending to urge the nut member away from the adjacent friction plates when the rotational speed of said shaft is less than the speed at which the first housing member tends to drag the nut member, means for defining a helical threaded interengagement between said shaft and the nut member in said second housing member tending to urge the nut member away from the adjacent friction plates when the rotational speed of said shaft is greater than the speed at which the second housing member tends to drag its nut member, means for limiting the travel of said nut members on said shaft toward said sets of plates, means for supplying fluid under pressure between said pistons so as to urge them and the adjacent plates into the travel paths of the respective nut members, and means for exhausting said fluid under pressure from between said pistons so that movement of said nut members to the limit of their travel toward the sets of plates cannot clamp the plates to rotatively lock the shaft and the respective housing members together.

References Cited in the file of this patent
UNITED STATES PATENTS

| | | |
|---|---|---|
| 1,938,457 | McCaffery | Dec. 5, 1933 |
| 2,349,925 | Andreau | May 30, 1944 |
| 2,620,684 | McFarland | Dec. 9, 1952 |
| 2,796,942 | Hill | June 25, 1957 |
| 2,799,375 | Forster | July 16, 1957 |
| 2,959,237 | Hill | Nov. 8, 1960 |

FOREIGN PATENTS

| | | |
|---|---|---|
| 488,125 | France | Sept. 5, 1918 |